United States Patent [19]

Engels

[11] Patent Number: 5,375,983
[45] Date of Patent: Dec. 27, 1994

[54] EXPANDING FLUID PRESSURE SYSTEM

[76] Inventor: Judson Engels, 1700 Ridge Rd., Derby, Kans. 67037

[21] Appl. No.: 3,301

[22] Filed: Jan. 12, 1993

[51] Int. Cl.⁵ .................... F04B 17/00; F03G 7/06
[52] U.S. Cl. ........................... 417/379; 60/508; 417/394
[58] Field of Search ............... 417/52, 379, 207, 572, 417/394; 60/508

[56] References Cited

U.S. PATENT DOCUMENTS

| | | | |
|---|---|---|---|
| 926,408 | 6/1909 | Hall, Jr. | |
| 989,044 | 4/1911 | Pool | 269/140 |
| 1,920,094 | 5/1928 | Martin, Jr. | |
| 3,163,985 | 1/1965 | Bouyoucos | |
| 3,195,879 | 7/1965 | Bond et al. | |
| 3,353,787 | 11/1967 | Semo | |
| 3,986,354 | 10/1976 | Erb | 417/379 |
| 3,994,132 | 11/1976 | Jackson | 417/379 |
| 4,075,845 | 2/1978 | Allen | |
| 4,186,558 | 2/1980 | Kuo | |
| 4,220,006 | 9/1980 | Kindt | 417/379 |
| 4,231,720 | 11/1980 | Konig | 417/379 |
| 4,823,745 | 4/1989 | Yang | 60/530 |

FOREIGN PATENT DOCUMENTS

| | | | |
|---|---|---|---|
| 2119453 | 11/1983 | United Kingdom | 417/52 |
| 1488546 | 6/1989 | U.S.S.R. | 417/52 |

Primary Examiner—Richard A. Bertsch
Assistant Examiner—Roland G. McAndrews, Jr.
Attorney, Agent, or Firm—Dykema Gossett

[57] ABSTRACT

A system for utilizing the expansion of water as the water is transformed from a liquid state to a solid state includes a rigid outer container and a flexible inner bladder received centrally within the outer container. Hydraulic fluid is received within bladder, and water is disposed between the bladder and outer container. The hydraulic fluid is pressurized as the water is lowered in temperature to a freezing temperature. The pressurized fluid may be stored for selective release from the bladder to produce work utilizing the energy of the pressure within the hydraulic fluid.

14 Claims, 1 Drawing Sheet

EXPANDING FLUID PRESSURE SYSTEM

BACKGROUND OF THE INVENTION

This invention relates a system that operates from the expansion energy of a substance when the substance is transformed from one state to another state, and more specifically, to a device that operates from the expansion force of a substance as the substance increases in volume when transformed from a liquid to a solid state.

A substance that increases in volume, or expands, when transformed from a liquid to a solid state is water. As water freezes, it increases its volume by approximately 10%, depending on various conditions. Further, the maximum pressure available from the expansion of water when the water is transformed to ice is approximately 30,000 psi. The idea of utilizing the expansion of water as it freezes to produce a work is known. Efforts to effectively utilize this expansion energy, however, have generally been ineffective, or unsuccessful. The prior art methods have not been successful partially due to the length of the freeze and thaw cycle of water, and partially due to inefficiencies of the prior art systems in utilizing the energy available from the freezing forces of water.

In order to be of practical use, a system must be able to effectively and efficiently utilize the natural and artificial sources of cooling and heating to facilitate the temperature change of the water. Additionally, a system is more effective if it is able to draw usable energy from only the freezing portion of the freeze/thaw cycle of water. Finally, a system must have the capability of storing the energy available for a period of time before use.

The object of the present invention is to provide a system which effectively and efficiently extracts energy from the expansion forces produced by water as it freezes using naturally and artificially available sources of cooling and heating. Another object of the invention is to provide a system able to operate from either passive or active exposure to available sources of cooling and heating. Another object of this invention is to provide a system which can effectively operate only from the freezing of water when forming ice. A further object of the invention is to provide a system that allows the energy extracted to be used at a later time.

SUMMARY OF THE INVENTION

This invention provides a system for producing useful work from the forces of a substance as it expands when transformed from a liquid to a solid state. The system includes a device comprising a generally rigid outer container, and a generally flexible bladder received within the container. The bladder contains hydraulic fluid, and water is disposed between the bladder and the container. As the temperature is lowered below freezing, the water expands to pressurize the hydraulic fluid within the bladder. The pressurized hydraulic fluid is then selectively released from the device and used as a source of energy. An alternative embodiment of the invention provides a similar structure, but having water in the bladder, and hydraulic fluid surrounding the bladder.

BRIEF DESCRIPTION OF THE DRAWINGS

Various features of the present invention will become more apparent upon reading the following detailed description of the preferred embodiments, along with the appended claims in conjunction with the accompanying drawings, wherein identical reference numerals identify like features, and:

DETAILED DESCRIPTION OF PREFERRED EMBODIMENTS

Figure 1:
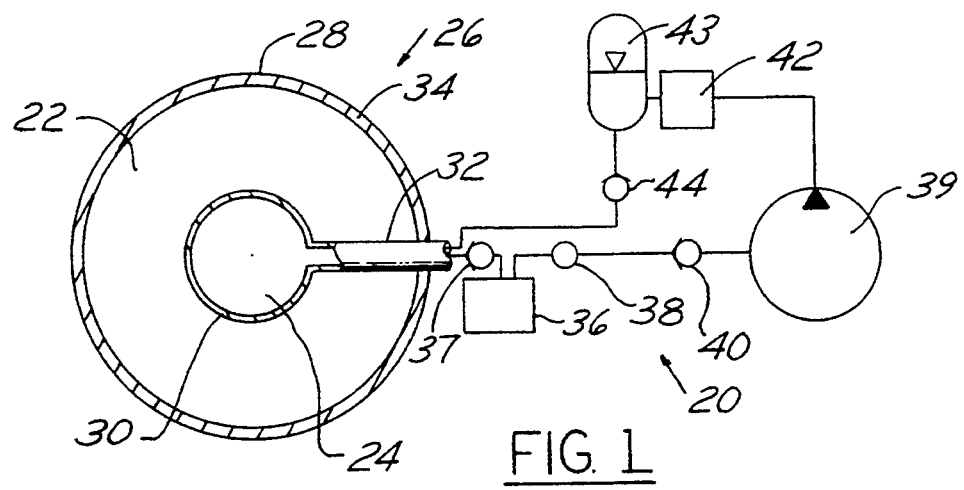
FIG. 1 is a schematic view of a system according to the present invention.

Referring now to the drawings, a system 20 according to the present invention is schematically illustrated in FIG. 1. The system 20 operates primarily from the energy available from a substance 22 that expands to exert a force when the substance 22 is transformed from one state to another state. Specifically, this invention utilizes the expansion of ordinary water when it is transformed by exposure to a lower temperature to form ice. The pressure caused by the expansion of the water produces useful work by pressurizing hydraulic fluid 24.

The system 20 is comprised of a device 26 that includes a generally non-expandable outer container 28, and a flexible bladder 30 received within container 28. Hydraulic fluid 24 is received in bladder 30. Substance 22 is disposed between bladder 30 and container 28 to completely surround bladder 30. The arrangement of bladder 30 within container 28 allows for substantially the entire outer surface area of bladder 30 to be in contact with substance 22. Container 28 and bladder 30 may be sealed to form a closed pressure system, and to prevent release of substance 22 and fluid 24, respectively. As substance 22 is lowered in temperature to freezing, a force is applied generally uniformly on the surface of bladder 30. The pressure exerted on bladder 30 pressurizes hydraulic fluid 24. Pressurized hydraulic fluid 24 may then be released from bladder 30 to produce useful work.

In a preferred embodiment, container 28 is spherical in shape, and bladder 30, which is also spherical, is positioned at a geometric central position within container 28. A fluid flow member 32 is adapted for centering bladder 30 within container 28, and allows for flow of fluid 24 from bladder 30 through container 28. The arrangement and shape of container 28 and bladder 30 allow for a maximum amount of pressure available from the expansion of water to be directed evenly towards bladder 30. The walls 34 forming container 28 are preferred rigid to direct expansion of substance 22 towards bladder 30. In most applications, the walls 34 of container 28 are also preferred to be of a material allowing for heat transfer to assist in the freezing and thawing of substance 22. Bladder 30 may be formed of any expandable material resistant to substance 22 and fluid 24.

To operate the system, substance 22 is in a liquid state when it initially surrounds bladder 30. Both substance 22 and fluid 24 are maintained within container 28 and bladder 30, respectively, under slight pressure to eliminate air pockets. In order to extract maximum energy when using water as substance 22, the system 20 should be initially charged at 4 degrees C., at 1 atmosphere of pressure, when the density of water is highest. Initially charging the device 26 in this manner allows utilization of maximum expansion of the water, although device 26 may be charged under other conditions.

As the water is lowered in temperature below freezing, pressure is exerted on bladder 30, thus pressurizing fluid 24. Ideally, fluid 24 is released before the water's temperature falls below the point at which the water crystallizes in a compressed state, known as ice II. Pressure is still exerted on the bladder when ice II is formed, but the availability of energy from the expansion forces is less. Therefore, to obtain maximum energy from device 26, fluid 24 should be released from bladder 30 prior to the crystallization of the water under pressure.

To allow for efficient operation of device 26 by extracting substantial energy available from the expansion of water, a pressure chamber 36 is provided. Fluid 24 flows under pressure through fluid flow member 32 and through check valve 37 to the pressure chamber 36, located outside of container 28. Pressure chamber 36 maintains fluid 24 under pressure, and allows for a reduction of the volume of fluid 24 within bladder 30 as volume of substance 22 increases. By use of check valve 37, pressure is maintained within pressure chamber 36, even after fluid within device 26 is no longer under pressure. Pressure chamber 36 maintains fluid 24 under pressure until fluid 24 is released by opening of valve 38. Fluid 24 is then directed to a work facilitator 39 through a check valve 40, which permits only a one way flow of fluid 24. Work facilitator 39 may be any apparatus which is able to operate from the energy provided by a pressurized fluid 24, such as a hydraulic motor. In some applications, pressure chamber 36 may not be necessary, and pressurized fluid may be directly released to work facilitator 39.

After fluid 24 is used by work facilitator 39, fluid 24 is directed towards an accumulator tank 42, including a pump 43, that stores fluid 24 and retains any remaining pressure available in fluid 24. This remaining pressure is used in recharging system 20 after substance 22 has thawed, in order to extract energy from additional freeze/thaw cycles. Transforming substance 22 to a liquid state may occur from passive active exposure to warmer temperatures, discussed below. During a recharge of system 20, fluid 24 is directed back in to the bladder 30 through check valve 44, which permits only one way flow from accumulator tank 42 to bladder 30.

A significant advantage of device 26 is achieved by the disclosed arrangement of a flexible bladder 30 received within container 28. Energy is drawn from device 26 in a single freeze cycle of substance 22, and can be stored within device 26, or within pressure chamber 36, for a period of time for later use.

Figure 2:
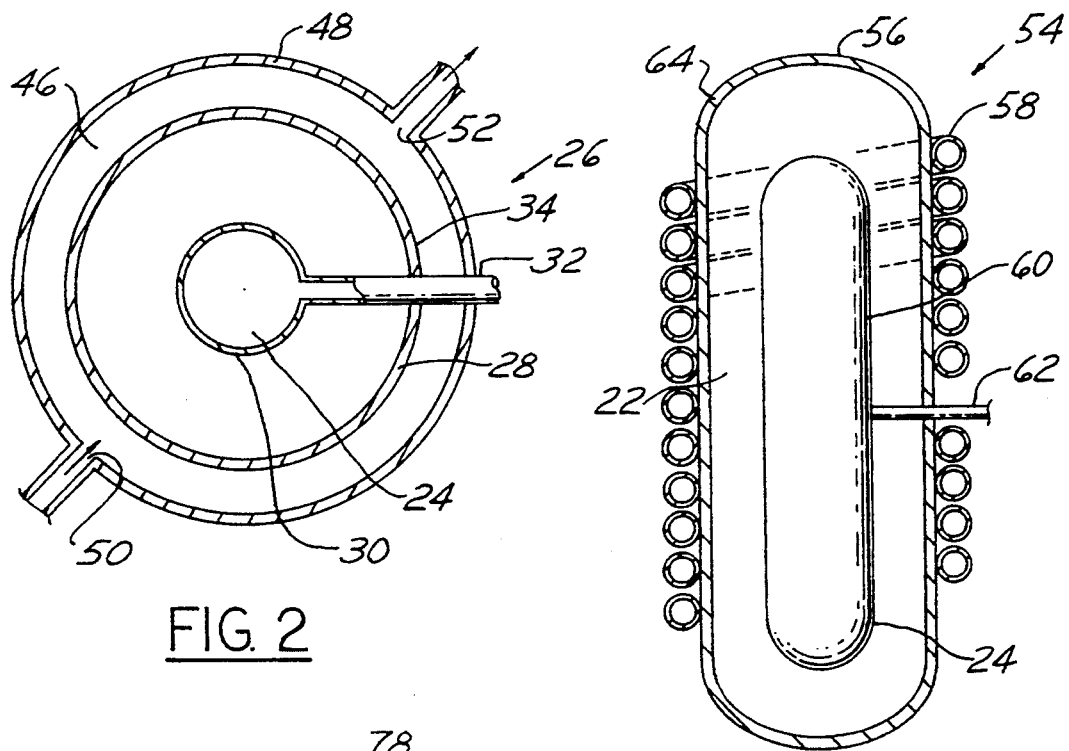
FIG. 2 is a schematic view of a device according to the present invention encapsulated in a variable temperature chamber.
Figure 3:
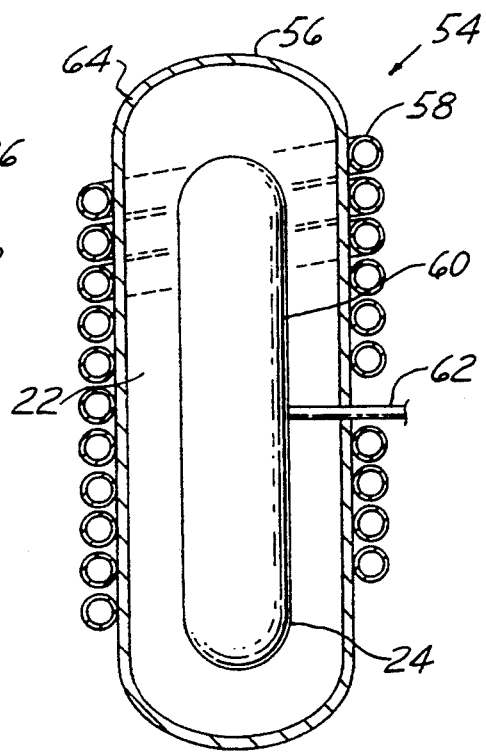
FIG. 3 is a view of a second embodiment of an elongated device incorporating variable temperature coils.

When recharging the system, substance 22 must be transformed from a solid to a liquid state. To facilitate the change in temperature of substance 22 within container 28, various methods may be employed. In some circumstances, substance 22 is cooled and heated by passive exposure to variable temperatures by placement in an area which fluxuates in temperatures over time. In other circumstances, active methods to freeze or thaw substance 22 are used, as illustrated in FIGS. 2 and 3. These methods utilize the flow of an additional fluid 46 around container 28. Fluid 46, which may be naturally or artificially cooled or heated, has a variable temperature to raise or lower temperature of substance 22.

Referring now to FIG. 2, a means to facilitate a temperature change of substance 22 is shown using a variable temperature chamber 48. Chamber 48 includes at least one inlet port 50, and at least one outlet port 52 for the flow of fluid 46 having a variable temperature into and out of chamber 48. At least a portion of container 28 is received within chamber 48 and preferably container 28 is encapsulated in chamber 48. A cold fluid may be used during the freeze cycle of substance 22, and a warmer fluid may be used to thaw substance 22 during the recharge cycle.

Referring now to FIG. 3, a second embodiment of the invention includes a device 54 having a modified container 56 that is elongated and shown with variable temperature coils 58. Located in a central position within container 56 is an elongated bladder 60 having fluid 24 within. Disposed between container 56 and bladder 60 is substance 22. A fluid flow member 62 allows for central placement of bladder 60, and permits flow of fluid 24 from bladder 60. Operation of device 54 to pressurize fluid 24 is similar to that previously described for device 26. To facilitate temperature change of substance 22, fluid 46 having a variable temperature flows through coil 58. Coil 58 contacts the outer walls 64 of container 56 to assist in heat transfer.

Figure 4:
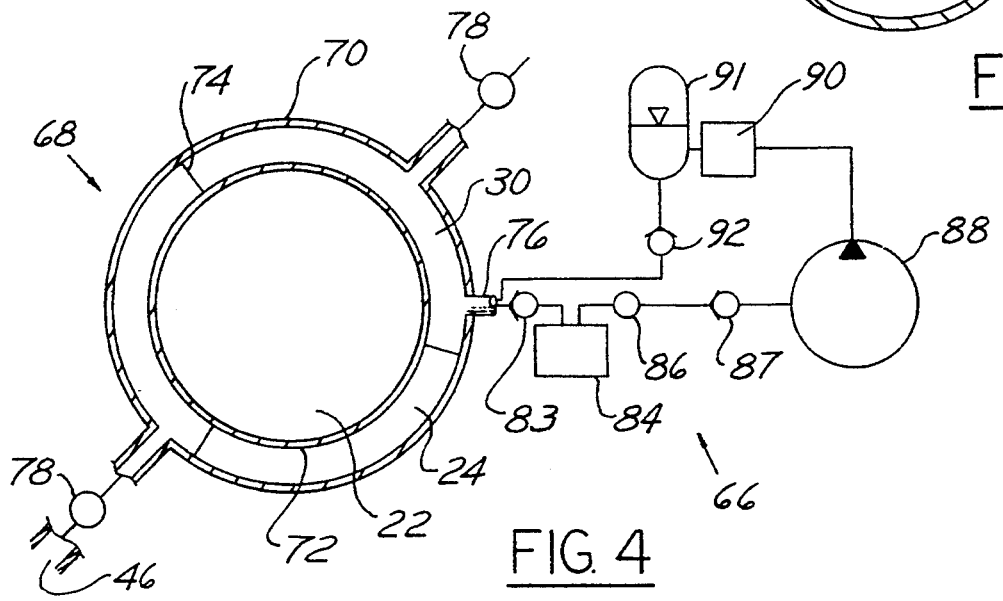
FIG. 4 is a third embodiment of the present invention.

FIG. 4 illustrates a third embodiment of the present invention. This alternative system 66 incorporates a device 68 having a rigid outer container 70, and a flexible bladder 72 received within container 70. Substance 22 is received within the bladder 72, instead of within the outer container, as previously described in the preceeding embodiments. The hydraulic fluid 24 is then disposed between bladder 72 and container 70. Bladder 72 is positioned at a geometric central position by use of a centering means 74, such as flexible rods or a perforated tube allowing for flow of a fluid, but resisting movement of bladder 72. Fluid is released under pressure through a fluid flow member 76. Container 70 is otherwise sealed by closing valves 78 when fluid 24 is being pressurized.

As the temperature of substance 22 is lowered to a freezing temperature by active or passive exposure of entire device 68 to freezing temperatures, bladder 72 expands to exert a force against fluid 24 sealed within container 70. As pressure increases in device 68, fluid 24 flows through check valve 83 to a pressure chamber 84 positioned outside device 68. Pressure chamber 84 maintains fluid 24 under pressure, as previously described, allowing for expansion of substance 22 within device 68. Fluid 24 is then released by opening valve 86, which directs fluid 24 to check valve 87 that permits only one way flow of fluid 24 to work facilitator 88.

After pressurized fluid 24 is used by work facilitator 88, fluid 24 is directed towards an accumulator tank 90, including a pump 91. Accumulator tank 90 maintains any remaining pressure in fluid 24, so that this pressure can be utilized in directing fluid 24 back into container 70 when recharging system 66. A check valve 92 permits only one way flow from accumulator tank 90 to container 70, when the system 66 is recharged.

To recharge system 66, an additional fluid 46 having varying temperature may be flushed through device 68 by opening valves 78, facilitating tile thawing of substance 22 in bladder 72. Preferably, the fluid flushed through device 68 is the same fluid used in operation. This embodiment allows for direct contact of a higher temperature fluid with bladder 70, which is generally formed of a material having high heat transfer properties, to assist in thawing of substance 22.

It should be understood that in all embodiments of the present invention the device is operable with any substance that expands when it is transformed from a liquid to a solid state. Although the drawings are not to scale, it is preferred that the bladder and container have volumes such that approximately 30% of fluid 24 exits the device due to expansion of substance 22. It is also preferred in some applications that fluid 24 be released from the device in a small stream relative to the size of the device in order to lengthen operational time the work facilitator.

Further, the disclosed devices of the present invention are also operable by a substance that expands when transformed from a solid to a liquid state, as opposed to a substance that expands when transformed from a liquid to a solid state, such as water. For the former substances, the system is initially charged while substance 22 is in a solid state. Pressure is exerted on bladder 30 as substance is transformed to a liquid state when the temperature rises to pressurized fluid 24.

The devices of the present invention may operate in numerous environments, and may be adapted for various uses and applications. In order to operate the system under passive conditions, the device may be placed in an area having a fluxuation between freezing and non-freezing temperatures. For example, the device may be positioned in a high/low tide area of the ocean so that the device is submerged in cold waters during high tide, and exposed to the sun's natural heat during low tide. In another example, the device can be placed outdoors in a climate where the temperature falls below freezing at night, and rises during the day. To assist in the thawing process, solar panels could be used in some instances to direct the sun's natural heat energy towards the container, when transforming substance 22 to a liquid state during recharge. Additionally, a plurality of the devices may be used in combination to provide a continuous source of pressurized hydraulic fluid for the work facilitator operating from the pressurized fluid. The plurality of devices may be in different stages of the freeze/thaw cycle by actively heating or cooling them.

While preferred embodiments of the present invention have been described so as to enabled one skilled in the art to practice the apparatus of the present invention, it is to be understood that variations and modifications may be employed without departing from the scope of the present invention. The scope of the invention should be determined only by reference to the following claims.

I claim:

1. A device for providing a pressurized fluid for use as an energy source, the device comprising:
   an outer member, said outer member being generally spherical;
   an inner member received within said outer member, said inner member being formed of a flexible material and being located at a geometric central position within said outer member;
   a fluid received in said inner member;
   a fluid release means to allow for release of said fluid from said device;
   a substance disposed between said outer member and said inner member, said substance being of the type which expands when transformed from a liquid state to a solid state; and
   whereby expansion of said substance results in pressure being applied to said inner member to produce a pressurized fluid within said inner member.

2. The device as recited in claim 1, wherein said fluid release means extends from an opening of said inner member, said fluid release means allowing placement of said inner member at said geometric central position within said outer member, and facilitating flow of said fluid from said inner member through said outer member.

3. The device as recited in claim 1, wherein said device further includes a pressure chamber positioned exterior to said outer member, said pressure chamber receiving said pressurized fluid, said pressure chamber maintaining said fluid under pressure.

4. The device recited in claim 1, wherein said outer member is generally non-expandable in order to direct expansion of said substance towards a surface of said inner member.

5. The device as recited in claim 1, wherein said outer member is formed of material allowing for heat transfer.

6. The device as recited in claim 1, wherein said device further includes a variable temperature means adjacent to at least a portion of an outer wall of said outer member, said variable temperature means adapted for the flow of a second fluid, said second fluid having a varying temperature effect a temperature change of said substance.

7. The device as recited in claim 1, wherein said substance is water.

8. The device as recited in claim 1, wherein said fluid is hydraulic fluid.

9. The device as recited in claim 1, wherein said device further includes a centering means for centering said inner member within said outer member.

10. The device as recited in claim 1, wherein said outer member includes an inlet port and an outlet port for selective flow of a fluid having variable temperature to facilitate a change in temperature of said substance within said inner member, said inlet port and said outlet port being selectively closable.

11. The device as recited in claim 1, wherein said device further includes a pressure chamber positioned outside said outer member, said pressure chamber receiving said pressurized fluid from said inner member, said pressure chamber maintaining said fluid under pressure, said pressure chamber allowing for release of said pressurized fluid from said inner member as said substance expands.

12. The device as recited in claim 1, wherein said device further includes a work facilitator, said work facilitator being operable from the energy provided by said pressurized fluid.

13. The device as recited in claim 12, wherein said device further includes an accumulator tank for receiving fluid after use by said work facilitator.

14. The device as recited in claim 1, wherein said work facilitator is a hydraulic motor.

* * * * *